(12) United States Patent
Wolf et al.

(10) Patent No.: US 7,322,754 B2
(45) Date of Patent: Jan. 29, 2008

(54) COMPACT OPTICAL SUB-ASSEMBLY

(75) Inventors: Robert K. Wolf, Fleetwood, PA (US);
Hui Fu, Allentown, PA (US); Anthony T. Yesenofski, Allentown, PA (US);
Chris Hart, West Melbourne, FL (US);
Erji Mao, San Jose, CA (US); Heino Bukkems, Santa Clara, CA (US);
William K. Hogan, Merritt Island, FL (US)

(73) Assignee: JDS Uniphase Corporation, Milpitas, CA (US)

( * ) Notice: Subject to any disclaimer, the term of this patent is extended or adjusted under 35 U.S.C. 154(b) by 378 days.

(21) Appl. No.: 11/054,453

(22) Filed: Feb. 9, 2005

(65) Prior Publication Data

US 2005/0244111 A1    Nov. 3, 2005

Related U.S. Application Data

(60) Provisional application No. 60/543,726, filed on Feb. 11, 2004.

(51) Int. Cl.
*G02B 6/42* (2006.01)

(52) U.S. Cl. ........................... 385/93; 385/88; 385/92; 385/94

(58) Field of Classification Search ............. 385/88–94
See application file for complete search history.

(56) References Cited

U.S. PATENT DOCUMENTS

| | | | |
|---|---|---|---|
| 5,005,939 A | | 4/1991 | Arvanitakis et al. |
| 5,537,504 A | | 7/1996 | Cina et al. |
| 5,555,334 A | * | 9/1996 | Ohnishi et al. ............... 385/93 |
| 5,745,625 A | * | 4/1998 | Aikiyo et al. ................. 385/94 |
| 6,075,635 A | * | 6/2000 | Butrie et al. ................. 398/139 |
| 6,914,921 B2 | * | 7/2005 | Nishi et al. .............. 372/38.01 |
| 2003/0002822 A1 | * | 1/2003 | Ishiara et al. ................. 385/88 |
| 2004/0101006 A1 | * | 5/2004 | Iwafuji ........................ 372/36 |
| 2005/0125177 A1 | * | 6/2005 | Giaretta et al. ............... 702/79 |

OTHER PUBLICATIONS

U.S. Appl. No. 60/539,219, filed Jan. 26, 2004, Hargis et al.
U.S. Appl. No. 60/541,076, filed Feb. 2, 2004, Zack et al.

* cited by examiner

*Primary Examiner*—Michelle R. Connelly-Cushwa
(74) *Attorney, Agent, or Firm*—Allen, Dyer, Doppelt, Milbrath & Gilchrist, P.A.

(57) ABSTRACT

The invention relates to a compact transmitter optical sub-assembly (OSA), which can be used in small form factor optical transceivers. To limit back reflections from entering the laser cavity, the laser is disposed on a silicon optical bench (SiOB) at an acute angle to the longitudinal axis of the OSA. A portion of the light from the laser cavity passes through the back end of the laser cavity for measuring by a monitor photodiode. A rear beam steering lens redirects the portion of light into a v-groove in the SiOB and off of a reflective surface formed in the end thereof to the monitor photodiode, which is positioned face down over the v-groove.

18 Claims, 12 Drawing Sheets

COMPACT OPTICAL SUB-ASSEMBLY

CROSS-REFERENCE TO RELATED APPLICATIONS

The present invention claims priority from U.S. patent application Ser. No. 60/543,726 filed Feb. 11, 2004, which is incorporated herein by reference.

TECHNICAL FIELD

The present invention relates to a compact optical sub-assembly (OSA), and in particular to a transmitter optical sub-assembly (TOSA) including a light source mounted at an angle to the output axis.

BACKGROUND OF THE INVENTION

The driving forces in the transceiver manufacturing industry are reducing the form factor sizes, increasing the data transfer rates, and decreasing the costs. To achieve all of these goals, the conventional butterfly-type or transistor outline (TO) can design approach must be replaced with a more exotic component packaging approach. However, to provide an OSA that can be used over a wide range of data transfer rates and products, the OSA must use controlled impedance connections for the high speed RF electrical signal path between the OSA chip and the transceiver electronics. Moreover, the total number of component parts must be reduced, and manufacturable from readily available materials. The assembly processes, including optical alignment, must be simplified and/or automated to reduce labor costs and increase production rates, and the fiber receptacle components should support a variety of wavelengths.

Conventional OSA designs, such as the one disclosed in U.S. Pat. No. 5,537,504, issued Jul. 16, 1996 to Cina et al and assigned to the present Applicant, include a opto-electronic (O/E) transducer 4 mounted in a container 25, which is sealed by a window 26. Solid metallic leads 23 and 24 extend through the rear of the container 25 for soldering to other electrical leads or directly to a transceiver PCB. The Cina et al device will suffer from poor signal integrity at high data transfer rates, because the RF signals need to transmit through the leads 23 and 24, which limits the quality of the transmission and the positioning of the transceiver PCB. The use of flexible-tape conductive wiring has been disclosed in U.S. Pat. No. 5,005,939 issued Apr. 9, 1991 to Arvanitakis et al and assigned to the present Applicant, but only for connecting the existing leads of an OSA to the transceiver PCB. Moreover, the Arvanitakis et al device does not disclose the use of controlled signal impedance conductors required for high-quality high-data rate signals.

Conventional OSAs which are aligned with the optical axis of the optical coupler, generate unwanted back reflections. Solutions for eliminating back reflections in receiver optical sub-assemblies include mounting the photo-detector at an angle and/or providing an index matching block at the fiber/lens interface, as disclosed in copending U.S. patent application Ser. No. 60/539,219 filed Jan. 26, 2004, which is incorporated herein by reference. Alternatively, as disclosed in copending U.S. patent application Ser. No. 60/541,076 filed Feb. 2, 2004, which is incorporated herein by reference, the lens axis can be offset from the main optical axis to impart a tilt to the beam of light. Unfortunately, none of these solutions are suitable for TOSA designs, particularly TOSA applications with back facet monitor photodiodes.

An object of the present invention is to overcome the shortcomings of the prior art by providing an optical sub-assembly with a controlled signal impedance between the transducer chip and the transceiver PCB.

Another object of the present invention is to maximize functionality, while minimizing the size of the transducer chip to conform to small form factor design restrictions.

SUMMARY OF THE INVENTION

Accordingly, the present invention relates to a transmitter optical sub-assembly, for converting an electrical data signal into an optical data signal, comprising:

a housing for supporting the transmitter optical sub-assembly defined by a width;

an optical coupler attached to the housing for receiving an optical fiber along a longitudinal optical axis;

a laser assembly including a laser and a modulator mounted in said housing, for generating light comprising the optical data signal, the laser for launching a beam light from a front face along a laser axis, which is at an acute angle to the longitudinal optical axis, and for releasing a portion of the light from a rear face along the laser axis;

an electrical connector for transmitting the electrical data signal from host electronics to the laser;

a front lensing means for directing the beam of light from the laser assembly to the optical coupler;

a monitor photo-detector for receiving the portion of the light from the rear face providing a signal indicative of the beam of light;

a rear beam steering lens for redirecting the portion of the light from the laser axis back towards the longitudinal optical axis, and for focusing the portion of the light onto the monitor photo-detector, thereby enabling the width of the housing to be reduced.

BRIEF DESCRIPTION OF THE DRAWINGS

The invention will be described in greater detail with reference to the accompanying drawings which represent preferred embodiments thereof, wherein.

DETAILED DESCRIPTION

With reference to FIGS. 1 to 4, a transmitter optical sub-assembly (TOSA) according to the present invention, generally indicated at 1, includes an optical coupler 2, a main housing 3, and an electrical connector 4. The optical coupler 2 defines a bore 6 with a zirconia split sleeve 7 therein for receiving an optical fiber ferrule mounted on the end of an optical fiber, preferably fitted into an LC optical connector, as is well known in the art. An angle polished ferrule 8 is mounted in the optical coupler 2 for transmitting light from the housing to the optical fiber along a main optical axis OA.

Preferably, the main housing 3 is comprised of a metal injection molded (MIM) hermetic package 9 with a lid 11, comprised of a material with a relatively low coefficient of thermal expansion, e.g. Kovar, although any suitable construction method and material can be used. A focusing lens 12 hermetically seals the front or optical end of the housing 3, while a multi-layer ceramic electrical feedthrough 13 hermetically seals the back or electrical end thereof. A opto-electronic transducer, in the form of a laser assembly comprising a laser 14, e.g. an externally modulated optical cavity laser (EML) diode, and a modulator 15 is mounted on a silicon optical bench 16 within the main housing 3. An optical isolator 17 is positioned between the focusing lens 12 and the laser 14 to prevent light from the optical fiber from entering the laser 14.

A thermal electronic cooler (TEC) 18, preferably constructed of an array of bismuth telluride (BiTe) elements sandwiched between two pieces of ceramic, is positioned underneath the optical bench 16. The TEC 18 is included to cool or maintain the laser 14 at a predetermined fixed operating temperature. When the laser 14 is operated at a fixed temperature, performance is enhanced and optical signals can be transmitted over extended fiber distances, e.g. more than 100 km. In particular, the operating wavelength of the laser 14 is stabilized and the modulated wavelength variation (chirp) is reduced. A temperature stabilized laser also has less variation in electrical to optical transfer characteristic reducing the modulation requirements of the laser driver electronics.

Although the illustrated embodiment takes the form of a cooled TOSA, similar uncooled TOSA devices could also be constructed in this form factor, possibly with the inclusion of a driver chip as integration advances. This configuration would be well suited to heatsink the thermal energy produced by laser driver integrated circuits. Additionally, as wavelength locking componentry integration continues to shrink the size of those components, this form factor could be used to integrate wavelength locking functions, needed for dense wavelength division multiplexing (DWDM) applications, into a transceiver device.

Figure 1:
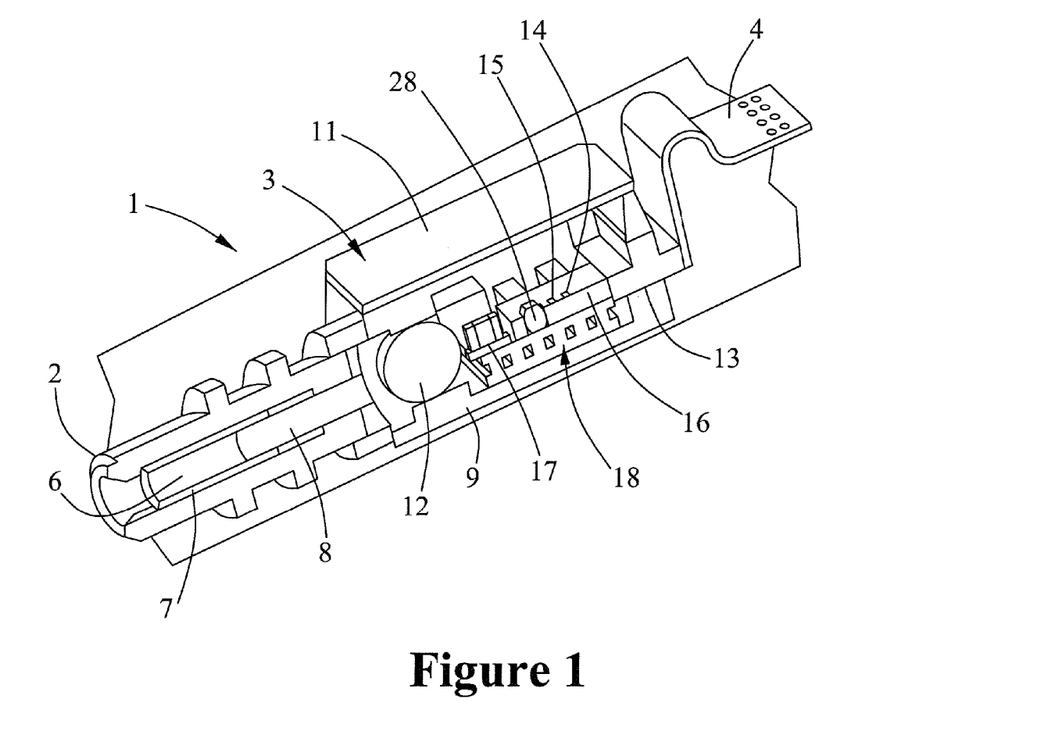
FIG. 1 is a cross-sectional isometric view of a transmitter optical sub-assembly (TOSA) according to the present invention.
Figure 2:
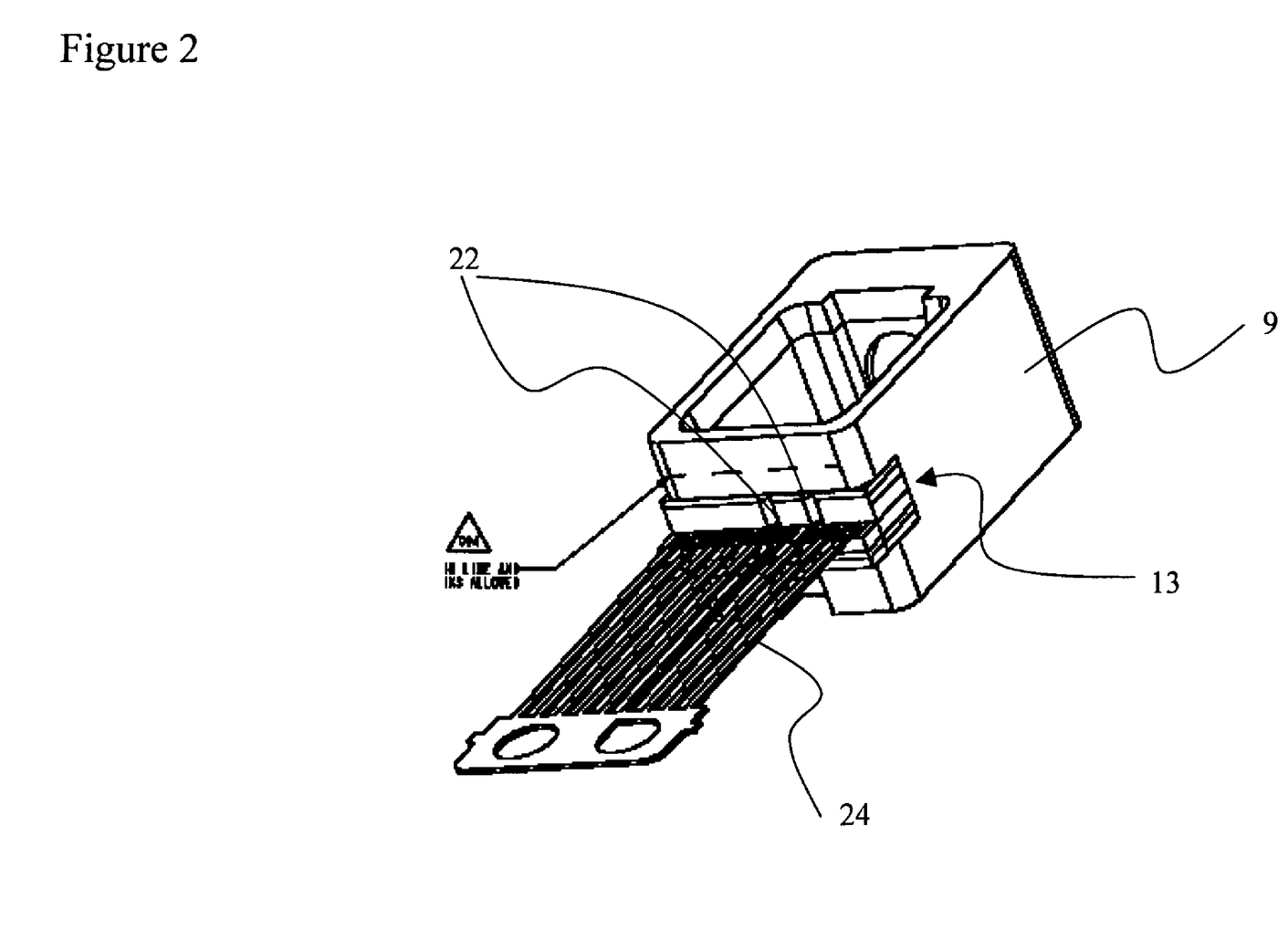
FIG. 2 is an isometric view of the housing of the TOSA of FIG. 1.
Figure 3:
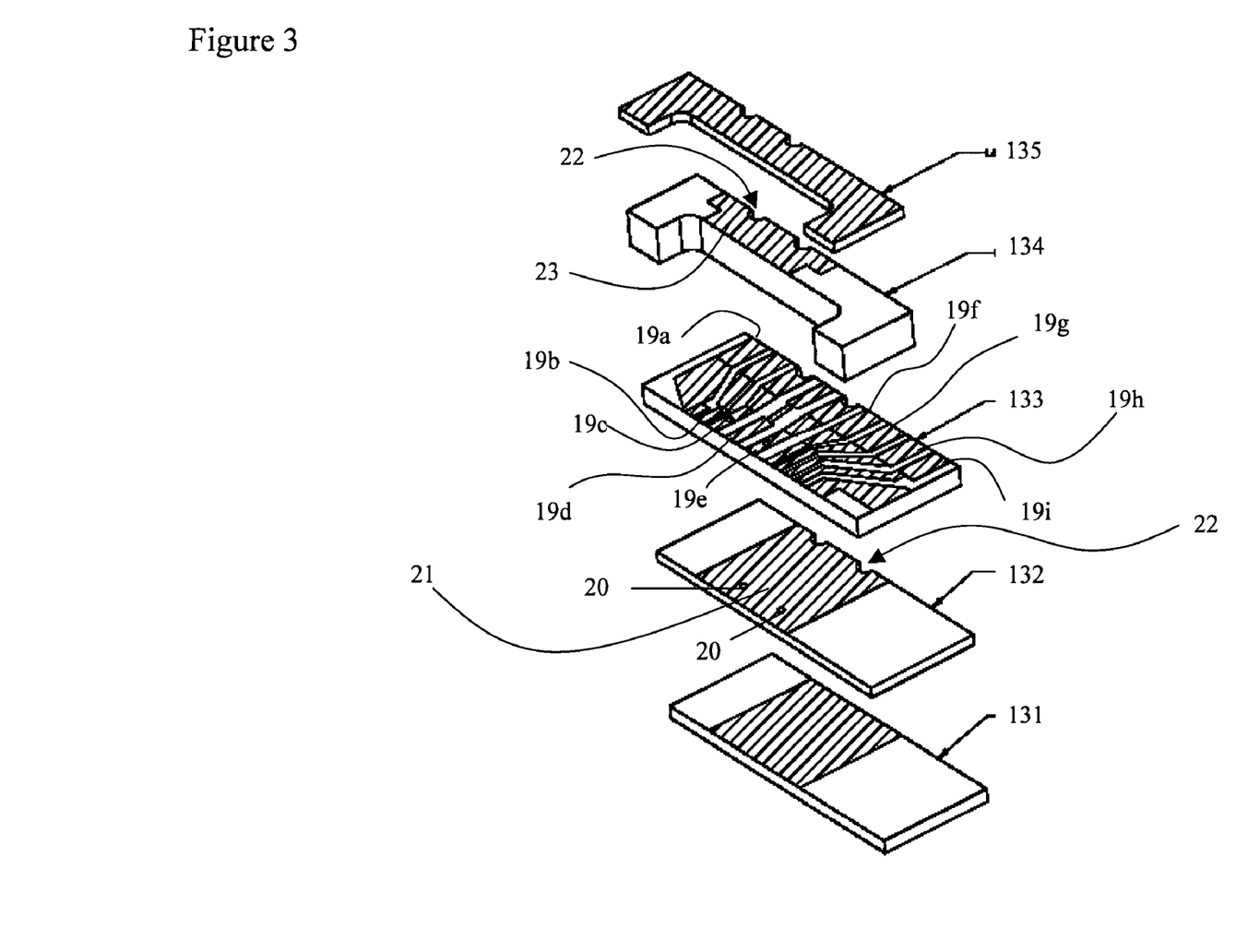
FIG. 3 is an exploded isometric view of the ceramic feedthrough of the TOSA of FIG. 1.

With reference to FIGS. 2 and 3, the multi-layer ceramic feed-through 13 includes five main ceramic layers 131 to 135, which provide low inductance ground connections, an RF ground reference plane, and micro-strip signal transmission structures for propagating high speed RF data signals to the laser 14. The middle layer 133 includes an array of conductive traces 19a to 19i, six of which 19a, 19b, and 19f to 19i provide power, control and monitoring function for the various components on the optical bench 16, e.g. monitor photo-detector and thermistor. Traces 19c and 19e are ground traces for high frequency signal trace 19d. Conductive vias 20 extend downwardly from traces 19c and 19e for connection with a first ground plane 21 formed on the second ceramic layer 132 between the first and second ceramic layers 131 and 132, respectively. Castellations 22, formed in the back of the first to fourth ceramic layers 131 to 135 extend from the first ground layer 21 upwardly to a second ground layer 23 formed on the fourth ceramic layer 134 between the fourth and fifth ceramic layers 134 and 135, respectively. The width of the signal trace 19d, the spacing between the signal trace 19d and the ground traces 19c and 19e, and the thicknesses of the third and fourth ceramic layers 134 and 135 are designed to provide a desired impedance, e.g. 25 Ω or 50 Ω, to match that of the laser 14. Additional ceramic layers can be provided between the third and fourth layers 133 and 134 and between the second and third layers 132 and 133 to achieve a desired thickness. The top and bottom of the first and fifth ceramic layers 131 and 135, respectively, are metalized and brazed to the housing 9.

The electrical connector 4 includes a multi-layer flexible circuit, referred to as a micro-strip transmission line, which a signal layer, a ground layer and a mask layer. The signal layer includes two RF data signal transmission lines, two or more ground lines, and four or more control lines. One end of the RF data signal transmission lines are connected to RF data signal pads on the ceramic feed-through 13, using BGA solder balls or other suitable means. Similarly, solder balls or other suitable means are used to connect one end of the control lines to control pads on the ceramic feed-through 13, while one end of the ground lines is connected to ground connection pads on the ceramic feed-through 13. The other ends of the lines include solder pads for connection to the transceiver PCB. The ground layer includes openings enabling access to the control lines, as well for the RF data signal lines. The ground lines are connected to the ground layer at various points. The mask layer provides a solder mask or cover for the copper ground layer, and includes a plurality of openings enabling access to the solder pads on the bottom of the ceramic feed-through 13.

Figure 4:
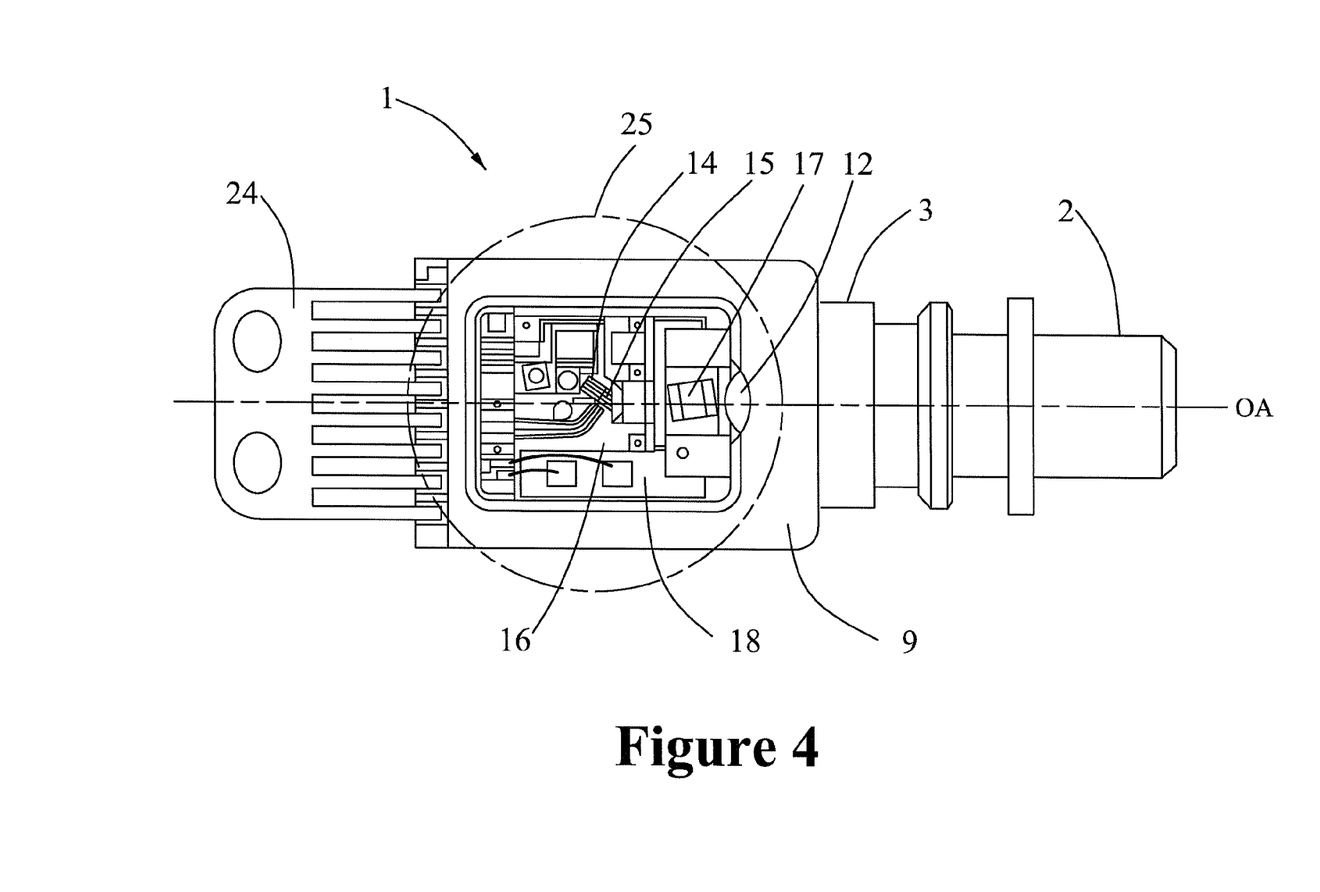
FIG. 4 is a top view of the TOSA of FIG. 1 with a housing cover removed.

As best illustrated in FIGS. 2 and 4, a lead-frame electrical interconnect 24 can be used with or in place of the flexible circuit 4 for connecting the ceramic feed-through 13 with a PCB in the host transceiver device. When used together the electrical interconnect 24 is trimmed, soldered to the flexible circuit 4, and bent into the configuration of FIG. 1.

Figure 5:
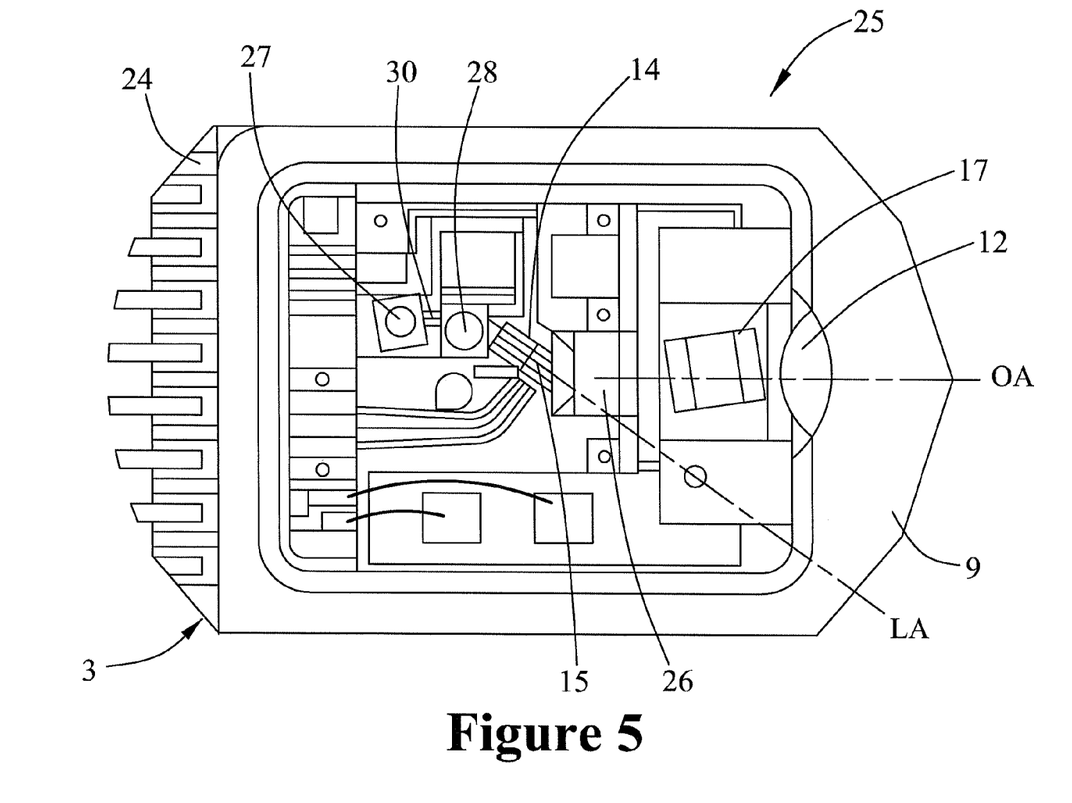
FIG. 5 is a top view of the internal optics and electronics of the TOSA of FIGS. 1 and 4.

FIG. 5 illustrates opto-electronic components 25 highlighted in FIG. 4. The EML laser 14 is defined by a laser cavity, which generates light and launches a beam of light along a laser axis LA into the modulator 15. Typically, the laser axis LA is disposed along the main optical axis OA; however, to limit the amount of light reflecting from the modulator/air interface and back into the laser cavity, the laser axis LA according to the present invention is positioned at an acute angle, e.g. θ=25° to 45°, preferably 33°, from the main optical axis OA, and the modulator 15 is curved for redirecting the beam of light from traveling along the laser axis LA to traveling along the main optical axis OA, whereby the beam of light will travel through a collimating lens 26 and the optical isolator 17 to the focusing lens 12 and out through the optical coupler 2 to an optical fiber therein. Alternatively, if the modulator is not curved, a lens or some other optic device could redirect the beam of light from the laser axis LA to the optical axis OA.

Figure 7:
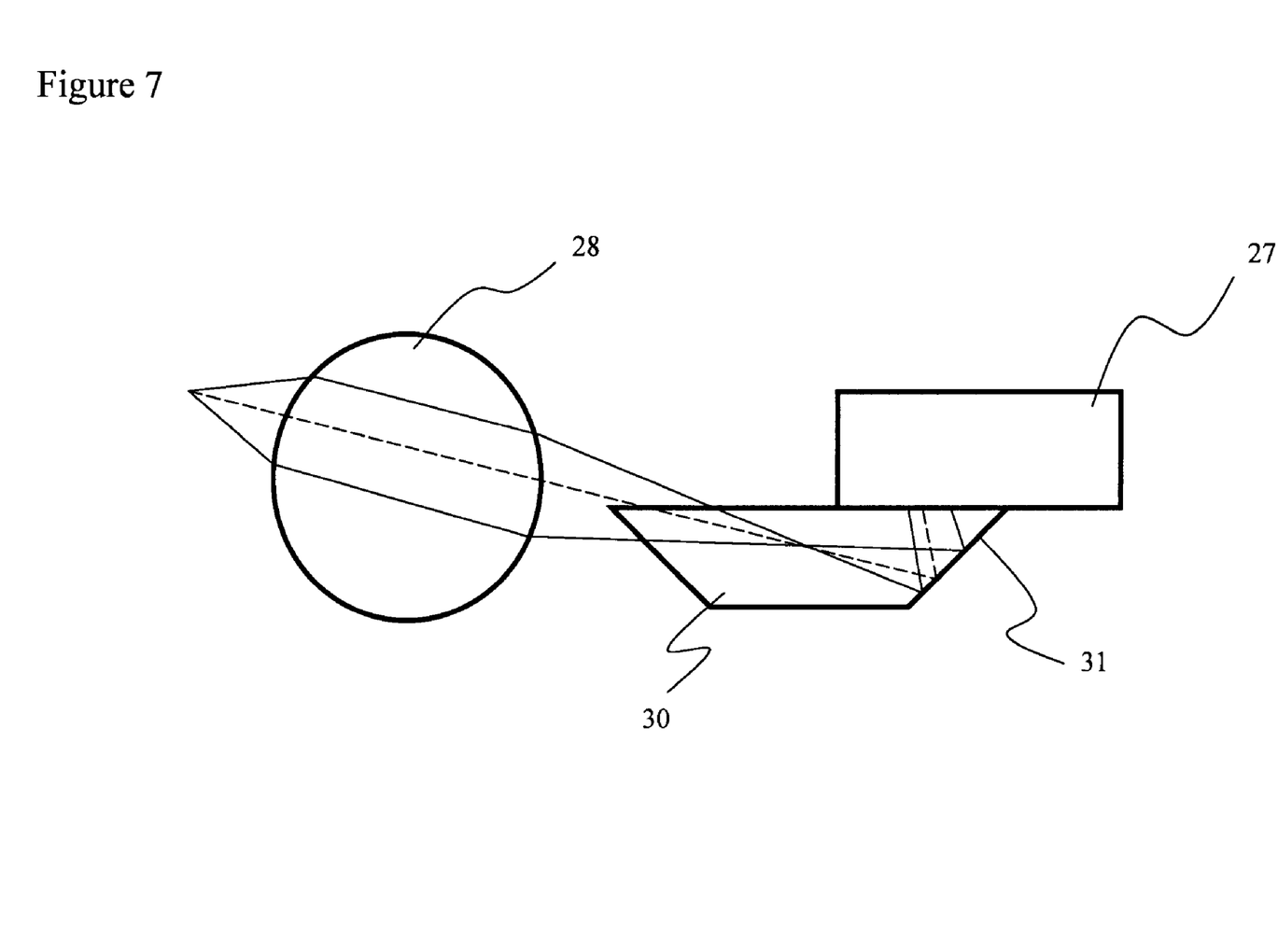
FIG. 7 is a side view of the rear beam steering arrangement for directing light to the monitor photo-detector.

A monitor photo-detector, e.g. photodiode 27, is positioned to the rear of the back facet of the laser 14 for measuring a small quantity of monitor light escaping therethrough to provide an indication of the power of the beam of light launched through the front facet. A rear beam steering lens 28 is provided for redirecting the monitor light from the laser axis LA to a photodiode axis parallel to the main optical axis OA. The photodiode axis could also be at a slight angle to the main optical axis OA in accordance with other alignment requirements, as long as the monitor light is tilted towards the main optical axis OA to save space on the optical bench 16. As best seen in FIG. 7, the rear beam steering lens 28 is mounted in a cavity 29 in the optical bench 16 and directs the monitor light downwardly into a v-groove trench 30 etched from the optical bench 16 and extending from the cavity 29. A reflective surface 31 is provided at the end of the trench 30 for redirecting the monitor light onto the photodiode 27, which is positioned face down over the trench 30. The rear beam steering lens 28 also focuses the monitor light onto photodiode 27, thereby increasing the monitor current and decreasing noise.

Positioning the photodiode 27 face down, i.e. not on an edge, enables the orientation thereof to be adjusted independent of the edge of the photodiode chip. Instead of requiring a highly accurate mounting place for an edge mounted photodiode, the present invention enables the photodiode 27 to be aligned in any x, y and θ direction.

Typically, monitor photodiodes would be mounted vertically directly behind the rear facet, which in accordance with the present invention would place the monitor photodiode along the laser axis LA. The industry standard spacing for a small form factor LC duplex fiber connector is 6.25 mm between the transmit and receive optical ports; therefore, the width of the housing 3 must be less than 6 mm to ensure proper spacing between the ROSA and the TOSA. Accordingly, positioning the monitor photodiode 27 along the laser axis LA would cause this critical dimension to be exceeded. Moreover, etching the trench 30 with the reflective surface 31 along the laser axis LA would be much more difficult, requiring a much larger etch, since they are not along the optical bench's crystalline plane.

Figure 6:
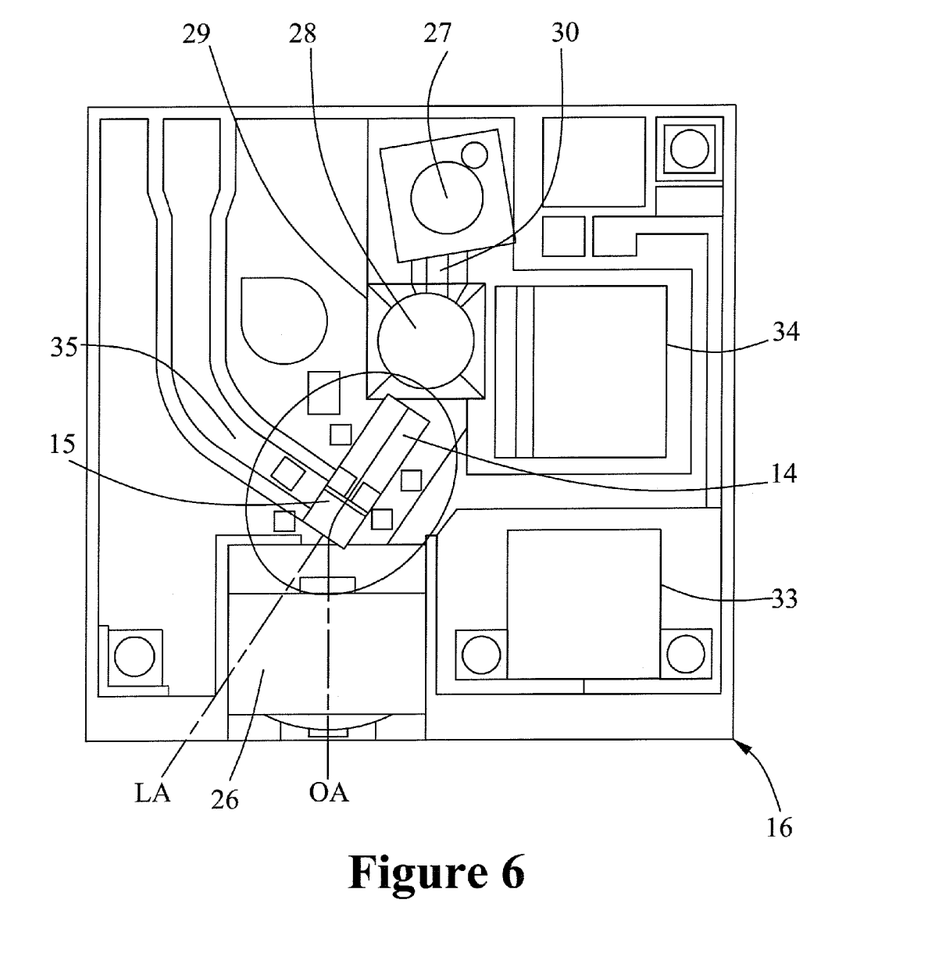
FIG. 6 is a top view of the optical bench of the TOSA of FIGS. 1, 4 and 5.

Other opto-electronic elements mounted on the optical bench 16 include a thermistor 33 for measuring the temperature of the laser 14, and a capacitor 34 defining a high bias filter used as a high frequency bias choke.

Figure 8:
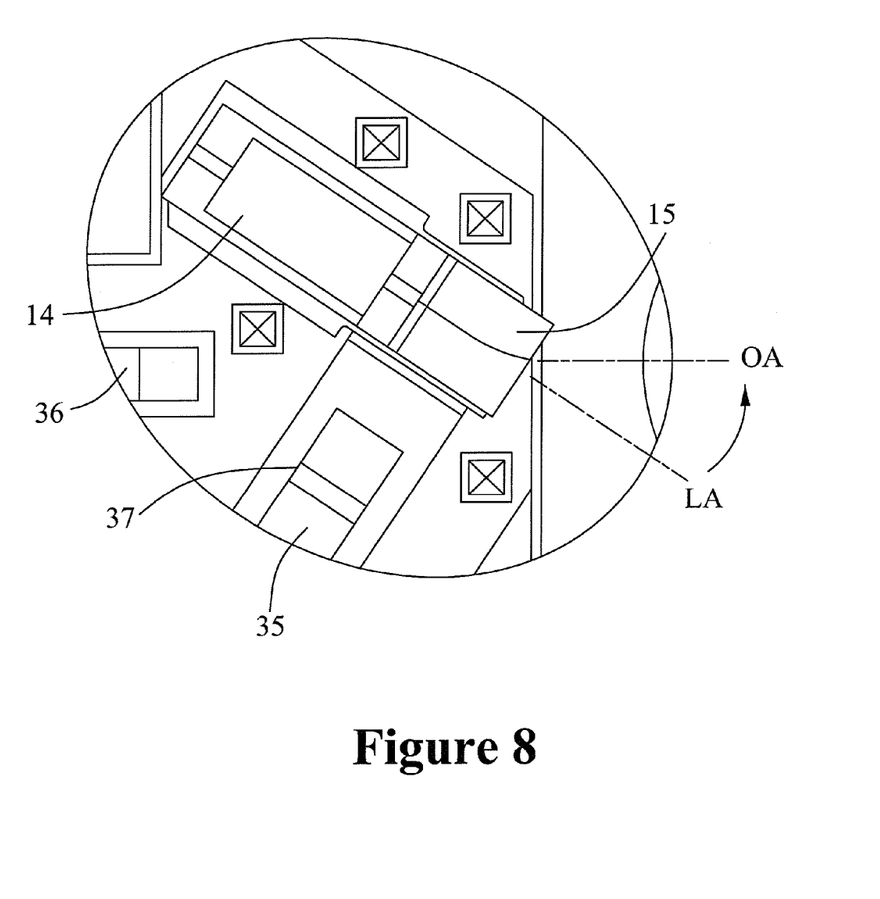
FIG. 8 is a top view of the highlighted section of the optical bench of FIG. 4.
Figure 9:
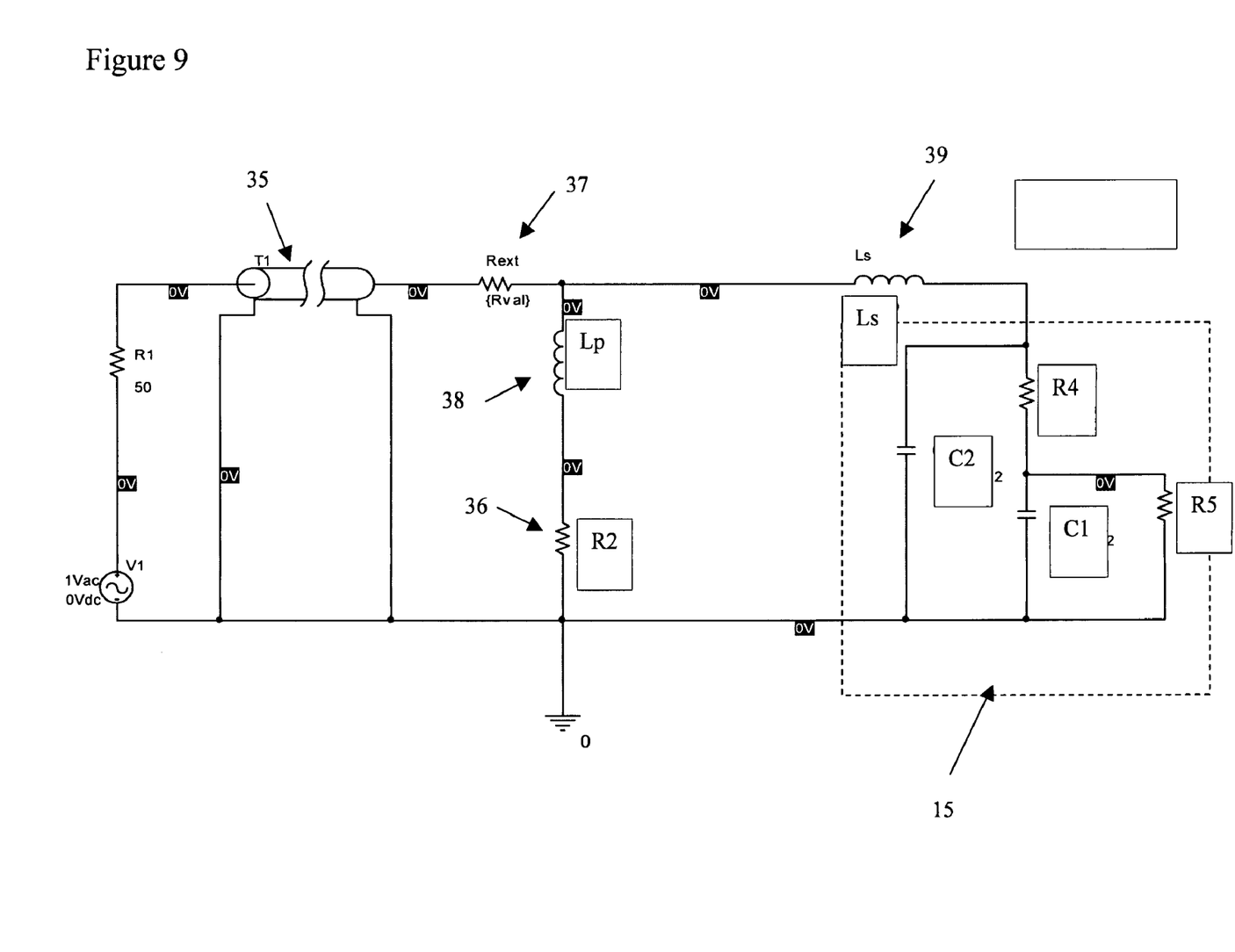
FIG. 9 is a circuit diagram of the TOSA of FIGS. 1 and 2.
Figure 10:
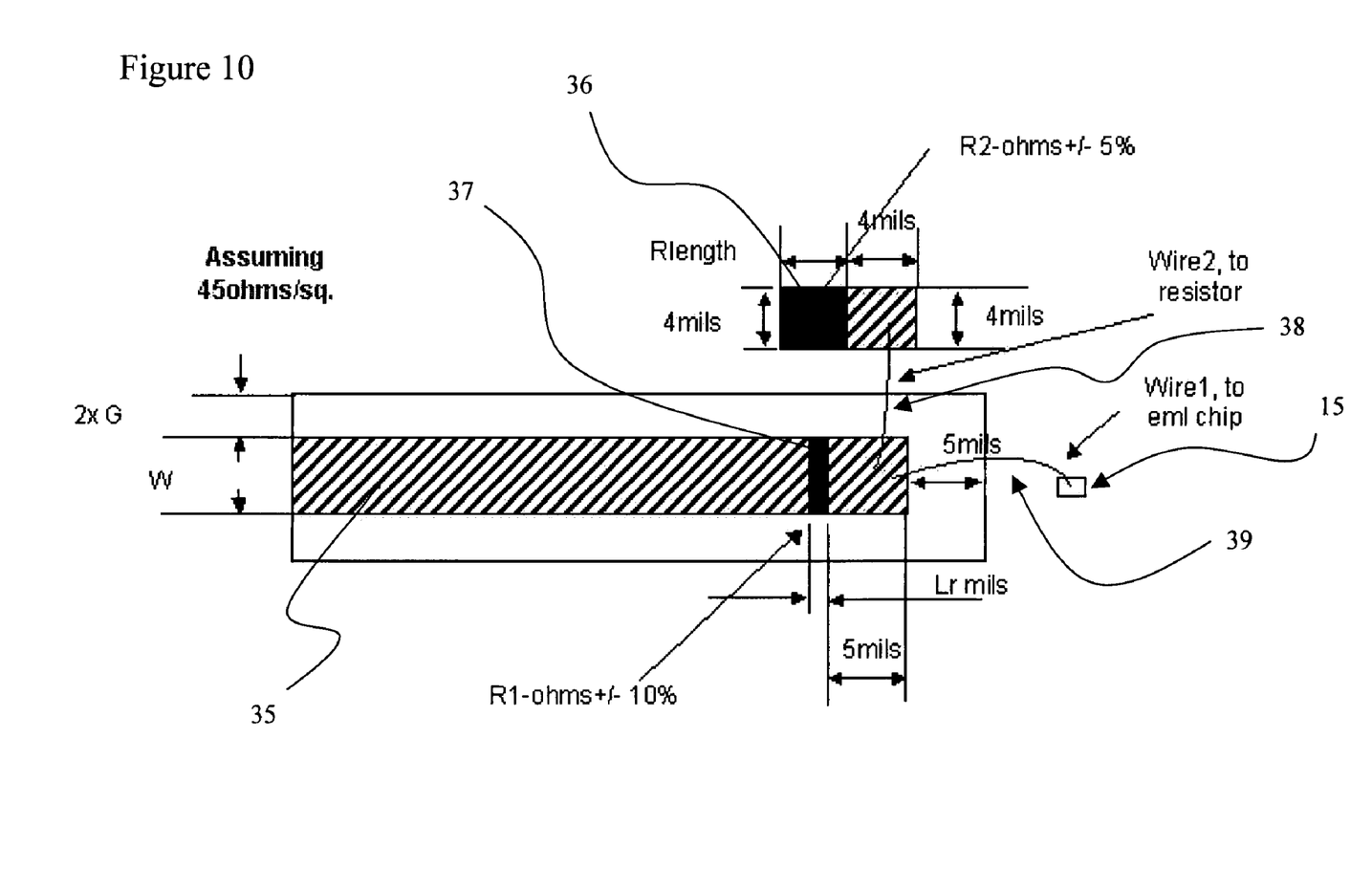
FIG. 10 is a top view of the integrated resistances of the optical bench of FIGS. 8 and 9.

With reference to FIGS. 8 to 10, a co-planar transmission line 35 is integrated into the optical bench 16 for transmitting RF signals to the laser assembly, i.e. modulator 15. The transmission line 35 includes a thin film resistor 36 integrated into the optical bench 16 adjacent to the transmission line 35 for providing an resistance in parallel with the transmission line 35 to match the impedance of the transmission line 35 with that of the laser assembly. An additional thin film resistor 37 is integrated into the transmission line 35 providing series resistance for reducing microwave reflections at relatively high frequencies, e.g. above 5 GHz. A bond wire 38 (FIG. 10) is used to connect the transmission line 35 and the parallel resistor 36, the inductance of which is represented by Lp in FIG. 9. Similarly a bond wire 39 is used to connect the transmission line 35 and the laser assembly, i.e. modulator 15, the inductance of which is represent by Ls in FIG. 9. V1 represents an external power source, while T1 represents the transmission line 35. C1, C2, R4 and R5 represent the equivalent capacitance and resistance of the modulator 15.

Figure 11:
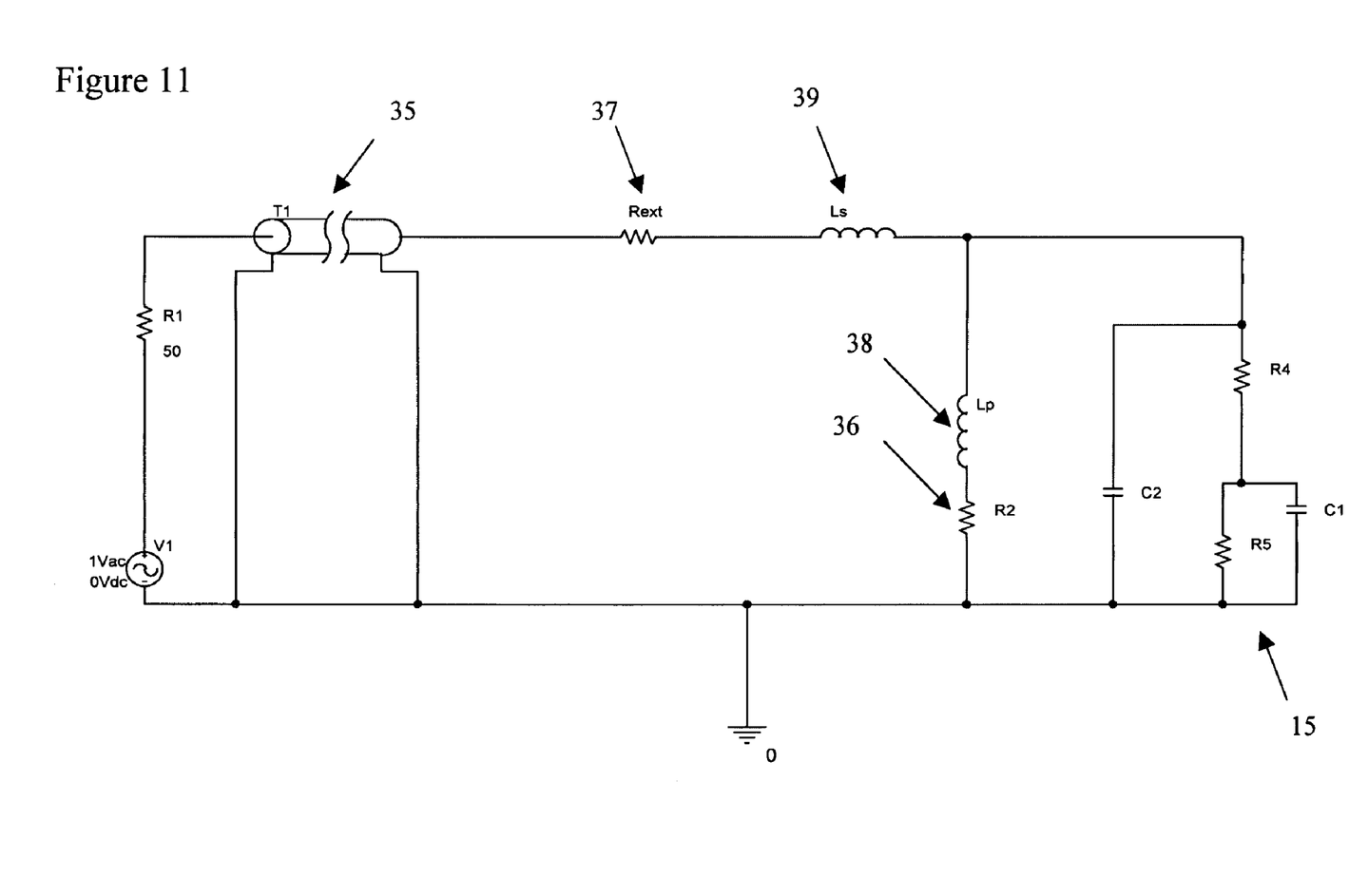
FIG. 11 is an alternative circuit diagram of the TOSA of FIGS. 1 and 2.

Alternatively, as illustrated in FIG. 11, both bond wires 38 and 39 for the parallel resistor 36 and the series resistor 37, respectively, can be connected to the modulator, thereby minimizing microwave reflection.

Figure 12:
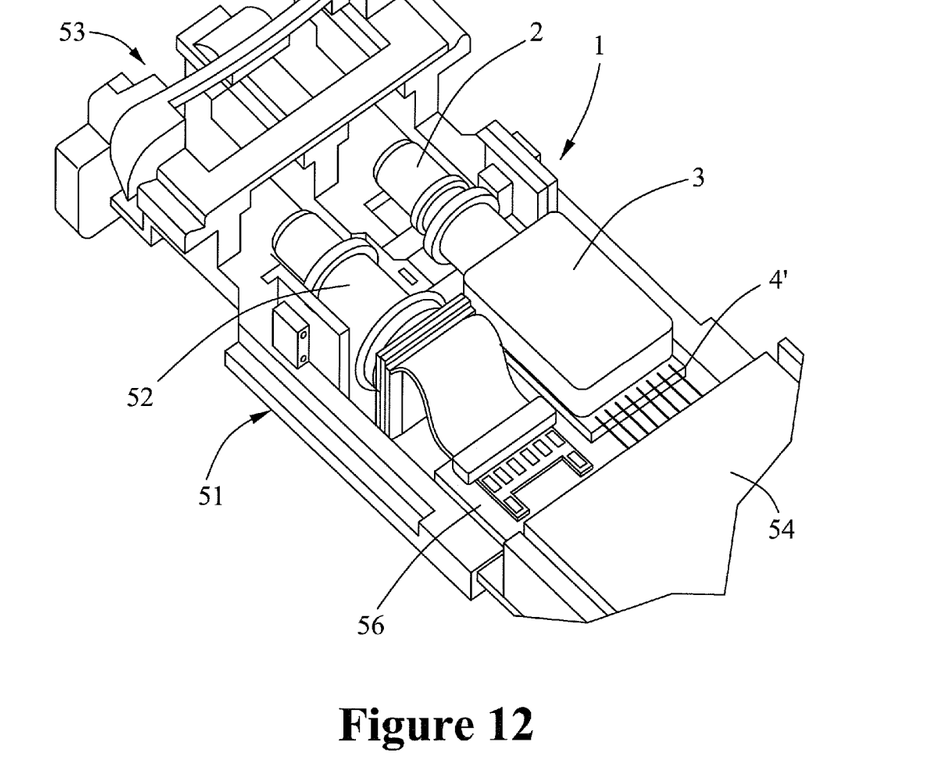
FIG. 12 is an isometric view of the TOSA of FIGS. 1 and 4 mounted in an optical transceiver.

FIG. 12 illustrates the TOSA 1, in accordance with the present invention, mounted in a small form factor optical transceiver housing 51 adjacent to a ROSA 52. The transceiver housing 51 includes an LC optical coupler 53 (or other suitable coupler) on a front end thereof, with an electrical connector extending from another end 54 thereof. A printed circuit board is mounted within the housing 51 providing control and monitoring circuitry for both the TOSA 1 and the ROSA 52.

We claim:

1. A transmitter optical sub-assembly, for converting an electrical data signal into an optical data signal, comprising:
    a housing for supporting the transmitter optical sub-assembly defined by a width;
    an optical coupler attached to the housing for receiving an optical fiber along a longitudinal optical axis;
    a laser assembly including a laser and a modulator mounted in said housing, for generating light comprising the optical data signal, the laser for launching a beam light from a front face along a laser axis, which is at an acute angle to the longitudinal optical axis, and for releasing a portion of the light from a rear face along the laser axis;
    an electrical connector for transmitting the electrical data signal from host electronics to the laser;
    a front lensing means for directing the beam of light from the laser assembly to the optical coupler;
    a monitor photo-detector for receiving the portion of the light from the rear face providing a signal indicative of the beam of light;
    a rear beam steering lens for redirecting the portion of the light from the laser axis back towards the longitudinal optical axis, and for focusing the portion of the light onto the monitor photo-detector, thereby enabling the width of the housing to be reduced.

2. The TOSA according to claim 1, wherein the rear beam steering lens redirects the portion of the light along or parallel to the longitudinal optical axis.

3. The TOSA according to claim 1, further comprising an optical bench for supporting the laser, the rear beam steering lens, and the monitor photo-detector.

4. The TOSA according to claim 3, wherein the rear beam steering lens redirects the portion of the light into a groove in the optical bench underneath the monitor photo-detector; wherein the groove includes a reflective surface for reflecting the portion of the light into the monitor photo-detector; and wherein the monitor photo-detector is mounted face down over the groove.

5. The TOSA according to claim 4, wherein the monitor photo-detector is mounted face down over the groove in a junction up rear-illuminated fashion or a junction-down flip-chip fashion.

6. The TOSA according to claim 4, wherein the housing is about 6 mm is width for mounting within industry standard small form factor transceivers.

7. The TOSA according to claim 3, wherein the optical bench includes a first impedance matching resistor connected in parallel with a transmission line to the laser to match the impedance of the transmission line with that of the laser, and a second impedance matching resistor connected in series with the transmission line to the laser for reducing microwave reflection at frequencies greater than 5 GHz.

8. The TOSA according to claim 7, wherein the second impedance matching resistors are electrically connected directly to the modulator.

9. The TOSA according to claim 7, wherein the first impedance matching resistor is a thin film resistor in a co-planar transmission line integrated into the optical bench.

10. The TOSA according to claim 1, wherein the electrical connector includes a multi-layer ceramic feed-through for bringing controlled impedance electrical data signals to the laser comprising:

spaced apart signal and ground traces extending from one side of the feed-through to another side between two of the ceramic layers;

a first ground plane positioned above the signal and ground traces with at least one ceramic layer with a first thickness therebetween;

a second round plane positioned below the signal and ground traces with at least one ceramic layer with a second thickness therebetween; and conductive vias extending vertically through the ceramic layers above and below the signal and ground traces for electrically connecting the first ground plane, the ground traces, and the second ground plane;

whereby the spacing between the signal and ground traces, and the first and second thicknesses are selected to provide a desire impedance.

11. The TOSA according to claim 10, wherein the electrical connector includes a flexible circuit attached to the ceramic feed-through including a conductive ground layer and a conductive signal layer for transmitting the electrical data and control signals along controlled impedance transmission lines.

12. The TOSA according to claim 1, further comprising a thermal electric cooler to maintain the laser at a stable operating temperature.

13. The TOSA according to claim 1, wherein the modulator redirects the beam of light from the laser axis to the longitudinal optical axis.

14. The TOSA according to claim 13, wherein the front lensing means comprises a collimating lens adjacent the laser assembly for collimating the beam of light, and a focusing lens mounted in the housing for focusing the beam of light onto the optical fiber.

15. A transmitter optical sub-assembly, for converting an electrical data signal into an optical data signal, comprising:
  a housing for supporting the transmitter optical sub-assembly defined by a width;
  an optical coupler attached to the housing for receiving an optical fiber;
  a laser assembly including a laser and a modulator mounted in said housing, for generating light comprising the optical data signal, the laser for launching a beam light from a front face along a laser axis, and for releasing a portion of the light from a rear face along the laser axis;
  an electrical connector for transmitting the electrical data signal from host electronics to the laser;
  a front lensing means for directing the beam of light from the laser assembly to the optical coupler;
  a monitor photo-detector for receiving the portion of the light from the rear face providing a signal indicative of the beam of light;
  a rear beam steering lens for redirecting the portion of the light from the laser axis to a photo-detector axis, which is at an acute angle to the laser axis, and for focusing the portion of the light onto the monitor photo-detector; and
  an optical bench for supporting the laser, the rear beam steering lens, and the monitor photo-detector;
  wherein the rear beam steering lens redirects the portion of the light into a groove in the optical bench underneath the monitor photo-detector;
  wherein the groove includes a reflective surface for reflecting the portion of the light into the monitor photo-detector; and
  wherein the monitor photo-detector is mounted face down over the groove.

16. The TOSA according to claim 15, wherein the monitor photo-detector is mounted face down over the groove in a junction up rear-illuminated fashion or a junction-down flip-chip fashion.

17. A transmitter optical sub-assembly, for converting an electrical data signal into an optical data signal, comprising:
  a housing for supporting the transmitter optical sub-assembly defined by a width;
  an optical coupler attached to the housing for receiving an optical fiber;
  a laser assembly including a laser and a modulator mounted in said housing, for generating light comprising the optical data signal, the laser for launching a beam light from a front face along a laser axis, and for releasing a portion of the light from a rear face along the laser axis;
  an electrical connector for transmitting the electrical data signal from host electronics to the laser;
  a front lensing means for directing the beam of light from the laser assembly to the optical coupler;
  a monitor photo-detector for receiving the portion of the light from the rear face providing a signal indicative of the beam of light;
  a rear beam steering lens for redirecting the portion of the light from the laser axis to a photo-detector axis, which is at an acute angle to the laser axis, and for focusing the portion of the light onto the monitor photo-detector; and
  an optical bench for supporting the laser, the rear beam steering lens, and the monitor photodetector;
wherein the optical bench includes a first impedance matching resistor connected in parallel with a transmission line to the laser to match the impedance of the transmission line with that of the laser, and a second impedance matching resistor connected in series with the transmission line to the laser for reducing microwave reflection at frequencies greater than 5 GHz.

18. The TOSA according to claim 17, wherein the first impedance matching resistor is a thin film resistor in a co-planar transmission line integrated into the optical bench.

* * * * *